United States Patent [19]

Fair

[11] Patent Number: 4,784,440
[45] Date of Patent: Nov. 15, 1988

[54] AUTOMOBILE WHEEL SHIELD

[76] Inventor: David L. Fair, 3947 Pierce St., #665, Riverside, Calif. 92505

[21] Appl. No.: 179,668

[22] Filed: Apr. 11, 1988

[51] Int. Cl.$^4$ ............................................. B60B 7/00
[52] U.S. Cl. ............................ 301/37 R; 301/37 PB; 118/505
[58] Field of Search ............ 301/37 R, 37 ST, 37 TC, 301/37 P, 37 H, 37 T, 37 TP, 37 PB, 37 B, 108 R, 108 A; 150/52 K, 54 R, 54 A, 54 B; 118/504, 505

[56] References Cited

U.S. PATENT DOCUMENTS

| 2,386,240 | 10/1945 | Lyon | 301/37 R |
| 2,580,543 | 1/1952 | Henderson | 301/37 R |
| 2,627,839 | 2/1953 | Hudgins et al. | 118/505 |
| 2,716,391 | 8/1955 | Nonemaker et al. | 118/505 |
| 3,007,401 | 11/1961 | Kordenbrock | 118/505 X |
| 3,854,448 | 12/1974 | Kromanaker | 118/505 |
| 4,628,858 | 12/1986 | King et al. | 118/505 X |

FOREIGN PATENT DOCUMENTS

| 500479 | 1/1951 | Belgium | 301/108 R |
| 2569619 | 3/1986 | France | 301/37 P |

Primary Examiner—Johnny D. Cherry
Assistant Examiner—Russell D. Stormer
Attorney, Agent, or Firm—John T. Matlago

[57] ABSTRACT

A wheel shield is disclosed for covering the wheel of an automobile so that the sidewall of the tire carried thereon can be sprayed with a protectant solution. The shield comprises a frusto-conical body having a circumferential rim on the large diameter open end therof and a knob on the small diameter closed end thereof. On the top of the cylindrical rim a retainer member is provided having an angularly inwardly and outwardly extending free end portion. On the body adjacent the cylindrical rim and opposite the free end portion a reinforcing box structure is provided. When the shield is placed over the outer flange of the wheel, a manual push applied on the front surface of the box structure forces the free end portion into the crevice formed between the rim portion of the wheel and the tire to thereby detachably hold the shield on the wheel.

11 Claims, 3 Drawing Sheets

U.S. Patent Nov. 15, 1988 Sheet 1 of 3 4,784,440
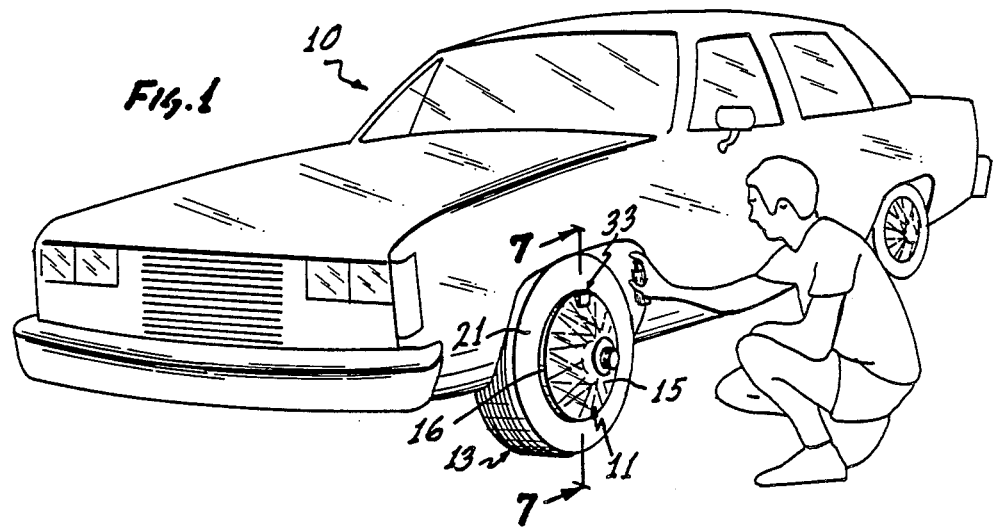
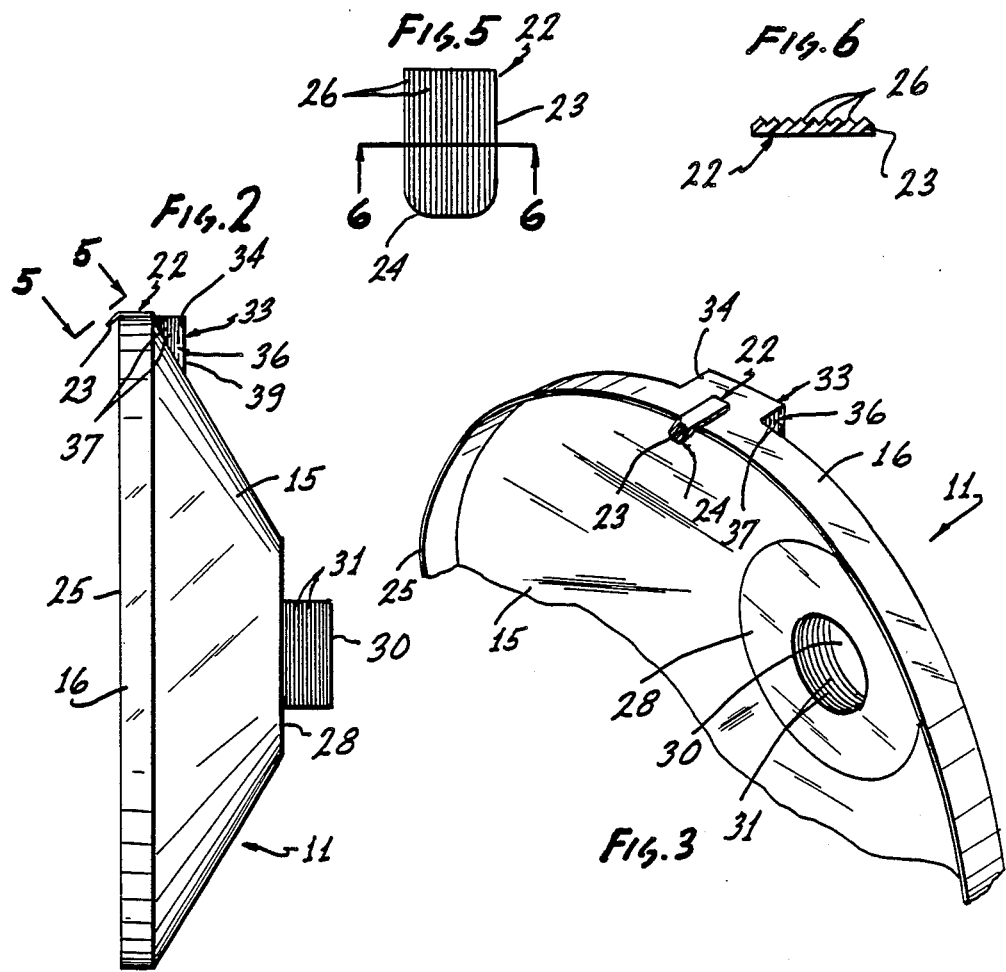

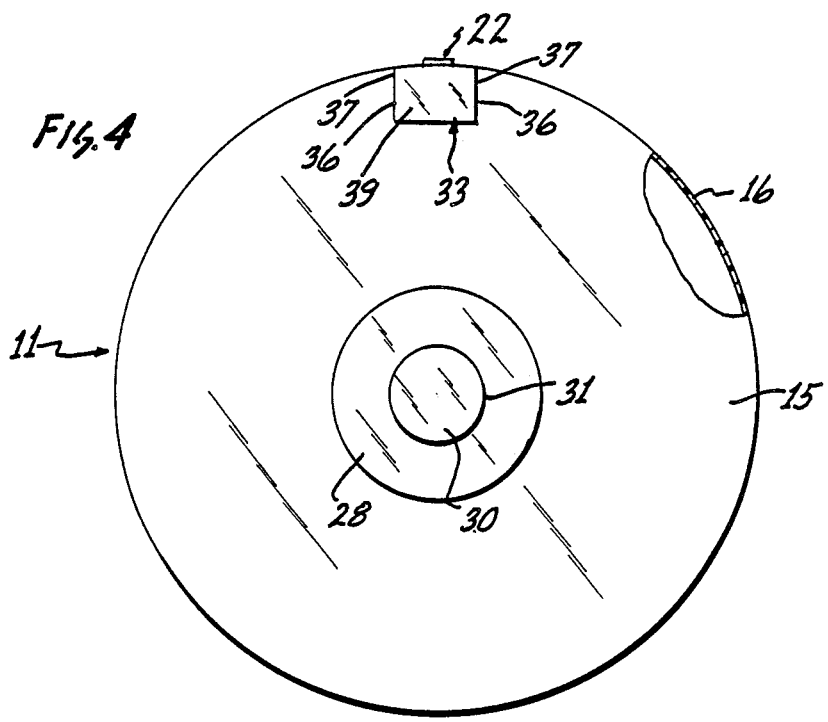
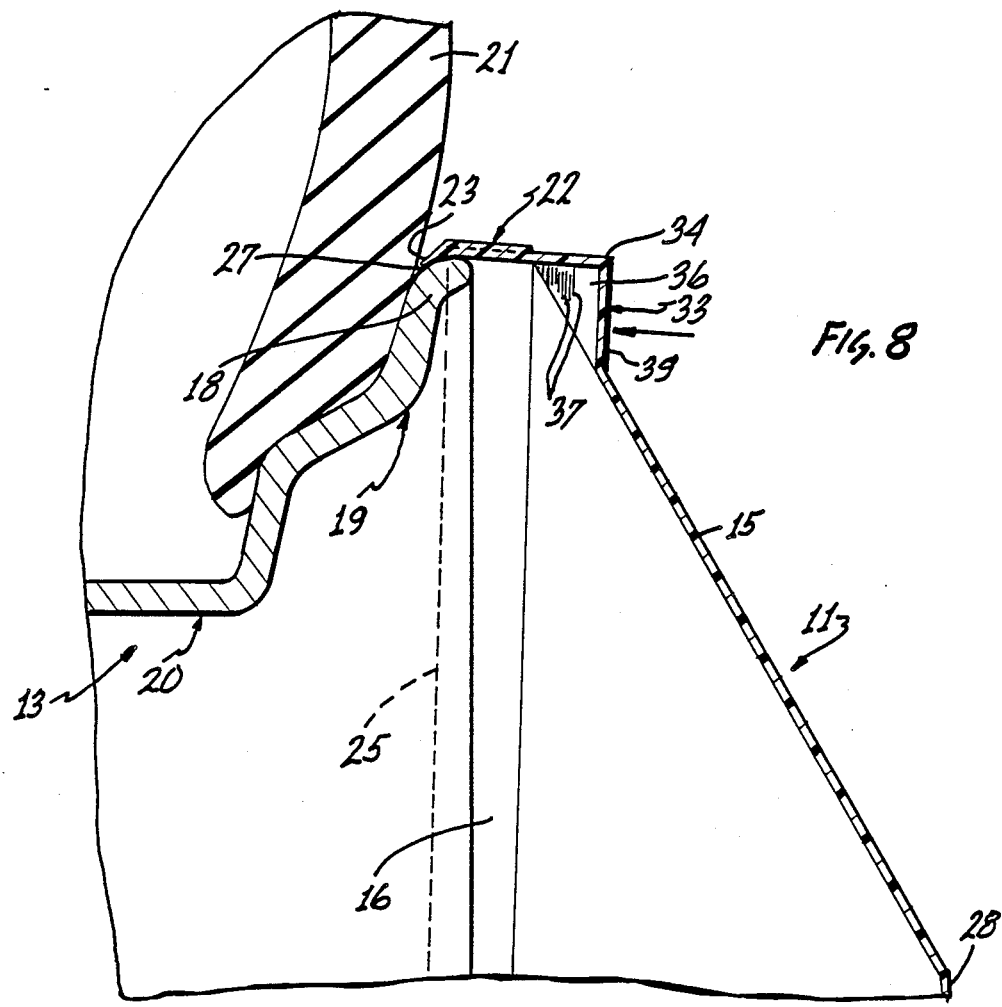

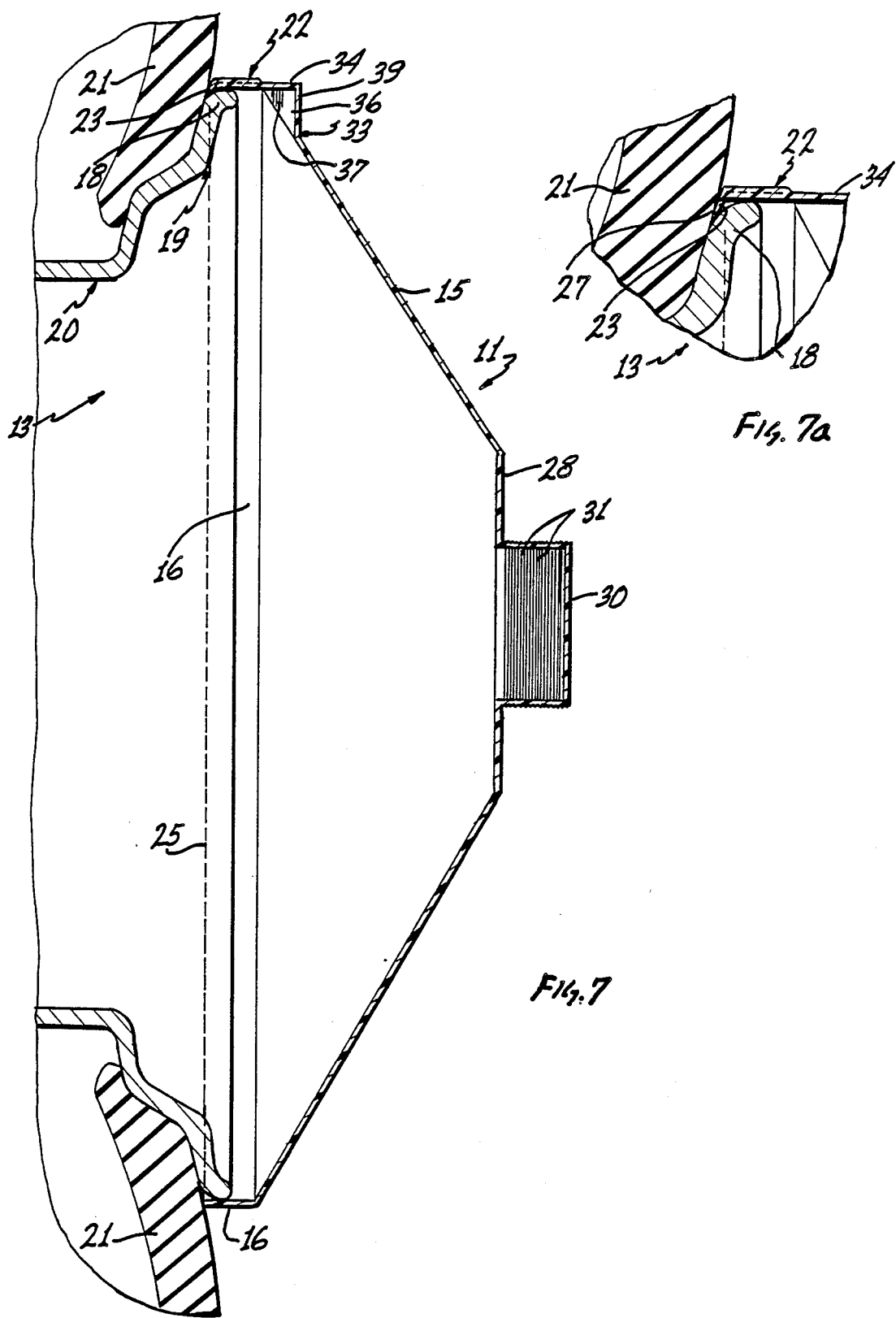

AUTOMOBILE WHEEL SHIELD

BACKGROUND OF THE INVENTION

This invention relates to a shield for masking a wheel of an automobile so that the sidewall of the tire mounted thereon can be sprayed with a solution that both protects and enhances the appearance thereof.

The wheels of automobiles are customarily formed of numerous spokes radial wires, curved surfaces and/or cut-out designs. In fact, owner's often replace the stock wheels of new automobiles with custom wheels having even more intricate and fanciful designs.

Moreover, it is highly desirable to coat the sidewalls of tires of automobiles with one of a number of protectant solutions made available on the market to guard against oxidation and ultra violet rays which tend to harden, crack and fade the rubber sidewalls, thus detracting from their appearance.

Although such a protectant solution may be applied to the sidewall of a tire on the automobile by use of a cloth or sponge, a more desirable manner of applying the solution is to spray it by use of the pressurized can in which it is sold.

The problem with spraying the protectant solution on the sidewall of the tire is that it is almost impossible to prevent the spray from hitting and/or forming droplets that tend to drip down onto the fanciful design body surfaces of the wheel. This solution, upon drying, smears and dulls and thus detracts from the appearance of the wheel. Accordingly, it has heretofore been the practice to spray the sidewall of the tire and then take the time to use a cloth or sponge to carefully wipe off the excess protectant solution that has inadvertently been applied to the fanciful body surfaces of the wheel.

SUMMARY OF THE INVENTION

In accordance with the present invention, a simple, inexpensive, one piece, thin, plastic molded wheel shield is provided. The shield is in the form of a frusto-conical body having a cylindrical rim on the large diameter open end thereof and a central cylindrical knob on the small diameter closed end thereof. When the shield is in its operative position with the axis of its frusto-conical body horizontally disposed, a molded retainer member having a radially inwardly and axially outwardly extending free end portion is provided on the top of the cylindrical rim. In addition, a molded box structure is provided to protrude from the frusto-conical body adjacent the cylindrical rim and opposite the free end portion of the retainer member such that the top wall thereof is an extension of the cylindrical rim. The box structure, which is provided with vertical sidewalls and a vertical front wall, serves to stiffen the portion of the cylindrical rim having the free end portion of the retainer member extending therefrom. In order to facilitate the use of the shield, the cylindrical knob is provided with circular serrations about the sidewall thereof and the box structure is provided with vertical serrations on the vertical sidewalls thereof. In addition, the free end portion of the retainer member is provided with longitudinal notches on the upper surface thereof.

Other features and advantages of the present invention will be made more readily apparent from the following detailed description of the preferred embodiment as illustrated in the accompanying drawings.

BRIEF DESCRIPTION OF THE DRAWINGS

FIG. 1 is a perspective view of an automobile showing the wheel shield of the present invention attached on one of the wheels thereof while the sidewall of the tire mounted thereon is being sprayed with a protectant solution;

FIG. 2 is a side view of the wheel shield;

FIG. 3 is a perspective partial back view of the wheel shield;

FIG. 4 is a front view of the wheel shield;

FIG. 5 is a view of the free end portion of the retainer member as taken along lines 5—5 of FIG. 2;

FIG. 6 is a cross sectional view as taken along lines 6—6 of FIG. 5;

FIG. 7 is a vertical cross sectional view on lines 7—7 of FIG. 1 showing how the wheel shield is detachably held on the wheel by the free end portion of the retainer member;

FIG. 7a is an enlarged detail showing of the free end portion of the retainer wedged on the crevice formed between the tire and the rim portion of the wheel; and FIG. 8 is a vertical cross sectional view, similar to FIG. 7, showing the top portion of the wheel shield positioned on the outer flange of the wheel prior to manually pressing the front wall of the box structure.

DETAILED DESCRIPTION OF PREFERRED EMBODIMENT

Reference will first be made to FIG. 1 of the drawings showing a conventional automobile 10 with the wheel shield 11 of the present invention detachably attached in operative position on one of the standard wheel and tire assemblies 13 thereon comprised of a wheel 20 (FIG. 7) and tire 21. As shown in FIGS. 2, 3 and 4, the wheel shield 11 is molded of preferably a transparent plastic material in the form of a frusto conical body 15. The large diameter open end of body 15 is provided with a cylindrical rim 16 and the opposite small diameter closed end of the body 15 is molded with a flat vertical wall 28 having a centrally disposed cylindrical knob 30 projecting therefrom for use in handling the shield 11. The outer sidewall of knob 30 is provided with circular serrations 31.

As shown in FIG. 7, cylindrical rim 16 has a diameter of such size as to enable it to readily fit over the peripheral surface of an outer flange 18 provided on the rim portion 19 of the wheel 20. Thus, when the shield 11 is in an operative position, its cylindrical rim 16 is applied to the periphery of outer flange 18 of wheel 20 such that the frusto-conical body 15 thereof projects axially of the wheel 20.

Referring back to FIGS. 2 and 3, an elongated retainer member 22 is integrally molded on the top of the cylindrical rim 16 when in operative position. Retainer member 22 is provided with a free end portion 23 which angularly extends radially inwardly and axially outwardly beyond the outer circumferential edge 25 of the cylindrical rim 16. As shown in FIGS. 2 and 5, the outer edge 24 of the free end portion 23 is beveled and the top surface thereof is provided with longitudinal notches 26.

Referring to FIGS. 2 and 3, a box structure is integrally molded so as to protrude from the frusto-conical body 15 adjacent the cylindrical rim 16 and opposite the free end portion 23 of the retainer member 22. The box structure 33 includes a top wall 34 which is an extension of the cylindrical rim 16, opposing vertical sidewalls 36 and a vertical front wall 39. The surfaces of the vertical sidewalls 36 are provided with vertically oriented serrations 37.

It should be noted that the protectant solution that is sprayed on the sidewall of the tire 21 tends to form a hard slippery surface when it dries. Thus, the purpose of the circular serrations 31 on the knob 30 and the vertical serrations 37 on the vertical sidewalls 36 of the box structure 33 are to enable the user of the wheel shield 11 to grasp these parts when it is desired to pull, that is detach, the wheel shield 11 from the wheel 20 on which it is being held during the spraying of the sidewall of tire 21.

Inasmuch as shield 11 is molded with a wall approximately 1/32 of an inch thick, the body and its rim 16 are relatively flexible. Hence, as will be more clearly made evident hereinafter, box structure 33 serves to give rigidity to, i.e., reinforce, the portion of the normally flixible cylindrical rim 16 with the retainer member 22 thereon and its relation to body 15. This makes it possible for a manual pressure applied on the vertical front wall 39 of the box structure 33 to be transmitted to the beveled free end portion 23 of the retainer member 22. As a result, the free end portion 23 gets wedged in crevice 27 (FIG. 7a) formed between the inner sidewall of the tire 21 and the inner surface of the outer flange 18, thereby detachably attaching the wheel shield 11 on the wheel and tire assembly 13.

Reference will next be made to FIG. 7 which is a vertical sectional view of a portion of the wheel 20 and the tire 21 of the standard wheel assembly 13 with the wheel shield 11 of the present invention being held in operative position thereon. It should now be clear that when it is desired to spray the protectant solution onto the sidewall of the tire 21, the user picks up the wheel shield 11 by its knob 30 and holds the shield 11 such that the cylindrical rim 16 is vertically disposed with the retainer member 22 located at the top thereof. The cylindrical rim 16 of shield 11 is then placed over the outer flange 18 formed on the rim portion 19 of the wheel 20 and pressure is applied on the knob 30 by one hand while pressure is simultaneously applied by the other hand on the flat vertical front wall 39 of the box structure 33. The pressure on the front wall 39 of box structure 33 causes the beveled edge 24 of the angularly inwardly directed free end portion 23 of the retainer member 22 provided with the longitudinal notches 26 thereon to slightly bend inwardly upon being forced into the small generally V shaped crevice 27 formed between the inner edge of the tire 21 and the inner side of the outer flange 18 of the wheel 20 (FIG. 7a). Thus, the free end portion 23 firmly but detachably holds the shield 11 in place with the circumferential outer edge of cylindrical rim 16 abutting up against the sidewall of the tire 21. It should now be clear that the axial width of the cylindrical rim 16 is made deep enough so that when so positioned on the outer flange 18 of the wheel 20, the hollow frusto-conical body 15 thereon clears any parts forming the body of the wheel 20.

Reference will next be made to FIG. 8 which shows the tilted position the cylindrical rim 16 assumes on the outer flange 18 of the wheel 20 when only the knob 30 is used to place the shield 11 on the wheel 20 and tire assembly 13. Note in FIG. 8 that the portion of the circumferential outer edge 25 of the cylindrical rim 16 at the top of the shield 11 is spaced from the sidewall of the tire by a distance equal to the extent that the free end portion 23 axially extends beyond the outer edge 25 of rim 16. This is because of the flexibility of the thin cylindrical rim 16 and the thin wall of the frusto-conical body 15 lying between the knob 30 and the rim 16 which makes it impossible to transmit any pressure applied on the knob onto the end portion 23 of the retainer member as needed to cause it to become wedged into the crevice 27.

It should now be clear that if the box structure 33 with its vertical front wall 39 were not provided on the shield one could not just push in on the portion of body 15 opposite the free end portion 23 and cause the latter to be wedged into crevice 27 because of the flexibility of the top portion of the rim 16 and the portion of body 15 adjacent thereto. Thus, when the vertical front wall 39 of the box structure is not available to push the free end portion 23 of the retainer member 22 into the crevice 27 formed between the sidewall of the tire 21 and the inner surface of the outer flange 18, the circumferential outer edge 25 of the cylindrical rim 16 does not abut the sidewall of tire 21 throughout its length and the shield 11 is not detachably attached to the wheel 20.

It should be noted that although the sizes of the diameters of the outer flanges of standard wheels are made so as to come within given design tolerances, these tolerances were never intended to be close enough to provide a frictional fit for any parts being mated therewith. Moreover, these outer flanges 18 are often made with very short axially extending protrusions on the rim portions 19, and, therefore, often provide little more than a point contact with the cylindrical rim 16. Hence, it is not possible to rely on providing a wheel shield 11 whose cylindrical rim 16 will have a sufficiently close sliding frictional fit to hold it on the outer flanges of all the wheels of a given standard size for which it is intended to be used. It is for these reasons that the retainer member 22 and the box structure 33 are needed on the shield 11.

As illustrated in FIG. 1, after placing the shield 11 in operative position on the wheel and tire assembly 13 of an automobile, the user commences to direct the spray of the can of protectant solution against the sidewall of the tire 21 without the need of too much concern as to whether the spray might inadvertently hit the shield 11 covering the body and flange of the wheel 20. It should be especially noted that since the sprayed solution tends to form droplets on anything it hits, the abutting of the circumferential edge 25 of the cylindrical rim 16 of the shield 11 for its full length up against the sidewall of the tire 21 assures the protection of the many curved and cut-out elemental surfaces of the body of the wheel 20. Thus the shield 11 protects the wheel not only from the sprayed solution but from possibly being exposed to any droplets of the solution that tend to run down the sidewall of the tire 21. Such droplets upon filling the crevice 27 between the inner sidewall of tire 21 and the inner side of the wheel outer flange 18 could seep through any cracks the cylindrical rim 16 makes with the outer flange 18 and drip onto the body of the wheel 20.

Upon completion of the spraying of the tire 21, the shield 11 can be detached, i.e., pulled off, from the outer flange 18 of the wheel 20 by first grasping the serrated vertical sidewalls 36 of the box structure 33 between the thumb and forefinger of one hand to pull out the free end portion 23 wedged in the crevice 27 and then grasping the serrated circular sidewall of the knob 30 by the fingers of the other hand to remove the shield from the wheel. The shield can then be positioned and attached, as previously described, on the outer flange on one of the other wheel and tire assemblies of the automobile whose tire is to be sprayed with the protectant solution.

It is noted that the advantage of molding the wheel shield 11 of clear plastic is so that, as the user of the shield 11 is applying the spray, he is able to clearly see how the protectant solution is smearing the body of the shield 11 and, therefore, appreciates that he is protecting the body of the wheel 20 from being similarly smeared.

It should be further noted that the companies who sell the protectant solutions for use on the sidewalls of rubber tires recommend that as many as two or three coats of the spray should be successively applied for best results. Hence, if a shield 11 is not used, it is necessary to wipe the many curved and cut-out surfaces of the body of the wheel 20 after each of these coatings is applied to make sure that the appearance of the surface of the body of the wheel 20 is not marred and dulled by the sprayed solution upon drying.

Although a preferred embodiment of the invention has been illustrated and described in detail, it will be apparent to those skilled in the art that various modifications may be made therein without departing from the spirit of the invention or the scope of the appended claims.

What is claimed is:

1. A shield for covering the wheel on an automobile during the process of spraying a protectant on the sidewall of the tire mounted on said wheel, said wheel having a rim portion with a flange and said tire being seated on said rim portion such that its sidewall forms a crevice therewith, said shield comprising:

a hollow body having a cylindrical rim on one end thereof for positioning over the outer flange of said wheel and a central knob on the other end thereof, said cylindrical rim having an circumferential outer edge;

an elongated retainer element on said cylindrical rim having an axially outwardly and radially inwardly directed beveled free end portion; and a reinforcing means with a flat surface located on the hollow body generally opposite the free end portion of said retainer element;

whereby said hollow body can be positioned by said knob with its cylindrical rim fitted over the flange of said wheel and by pushing on the flat surface of said reinforcing means, the free end portion of said retainer element can be wedged into the crevice formed between the sidewall of the tire and the rim portion of the wheel to thereby cause the shield to be detachably held on the wheel with the outer edge of said cylindrical rim abutting the sidewall of the tire.

2. The invention as defined in claim 1 wherein said hollow body is a frusto-conical body having a large diameter open end and a small diameter closed end, with said cylindrical rim on the large diameter open end thereof and said knob on the small diameter closed end thereof.

3. The invention as defined in claim 1 wherein said retainer element is integrally molded on said cylindrical rim with the free end portion thereof extending beyond the circumferential outer edge of said cylindrical rim.

4. The invention as defined in claim 1 wherein the beveled free end of said retainer element has an upper surface provided with a plurality of longitudinal notches.

5. The invention as defined in claim wherein the reinforcing means is a box structure having vertical sidewalls and a vertical front wall providing the flat surface.

6. The invention as defined in claim 5 wherein the vertical sidewalls of said box structure are provided with vertically oriented serrations.

7. The invention as defined in claim 1 wherein the knob on the hollow body has a cylindrical sidewall provided with circular serrations.

8. The invention as defined in claim 1 wherein the hollow body of said shield is molded of plastic with a wall approximately 1/32 of an inch thick.

9. The invention as defined in claim 8 wherein said plastic is transparent.

10. A shield for covering a wheel on an automobile during the process of spraying a protectant on the sidewall of a tire mounted on said wheel, said wheel having a rim portion with an outer flange and said tire being seated on said rim portion such that its sidewall forms a crevice therewith, said shield comprising:

a hollow frusto-conical body having a large diameter open end and a small diameter closed end with a cylindrical rim on the large diameter open end thereof and a knob on the small diameter closed end thereof, said cylindrical rim having an outer circumferential edge;

an elongated retainer means on said cylindrical rim having an axially outwardly and radially inwardly directed beveled free end portion; and a box structure having a front wall located on the frusto-conical body adjacent said cylindrical rim and opposite said free end portion of said retainer means;

whereby by use of said knob said frusto-conical body can be positioned with its cylindrical rim fitted over the outer flange of said wheel with at least the lower end of said outer circumferential edge abutting the sidewall of the tire and by pushing on said front wall of said box structure said free end portion of said retainer means can be forced in the crevice formed between the sidewall of the tire and the rim portion of the wheel thereby enabling the circumferential outer edge of said cylindrical rim to abut the sidewall of the tire throughout the circumference thereof while detachably holding the shield in an operative position on the wheel.

11. A shield detachably mounted on an automobile tire and wheel assembly to mask the wheel while spraying a protectant solution on the sidewall of the tire seated thereon, said wheel having a rim portion with an outer flange, said shield comprising:

a hollow frusto-conical body with a knob on the center of the small diameter closed end thereof and a cylindrical rim on the large diameter open end thereof, said cylindrical rim having an outer edge;

retainer means located on the top of said cylindrical rim and having a free end portion angularly extending radially inwardly and axially outwardly beyond the outer edge of said cylindrical rim; and a reinforcing means having a flat front surface located on the frusto-conical body opposite the free end portion of said retaining means;

said cylindrical rim on said hollow body being adapted to fit over the outer flange of said wheel; and said flat front surface is manually depressed to enable said free end portion to be forced between the rim portion of the wheel and the sidewall of the tire seated thereon to thereby enable the outer edge of said cylindrical rim to abut the sidewall of the tire while serving to detachably hold the shield on the wheel and tire assembly.

* * * * *